(12) United States Patent
Scherpbier et al.

(10) Patent No.: US 11,801,476 B2
(45) Date of Patent: *Oct. 31, 2023

(54) EFFICIENT AND FULLY AUTOMATED CATALYTIC DIRECT CARBON DIOXIDE CAPTURE FROM AIR SYSTEM

(71) Applicant: AirMyne, Inc., Berkeley, CA (US)

(72) Inventors: Bart Ludo Scherpbier, San Francisco, CA (US); Ngoc The Pham, San Jose, CA (US); Flynn Corrigan Michael Legg, Oakland, CA (US); Aryan Johari, San Diego, CA (US); Sophia Elaine Chandler Sperman, San Leandro, CA (US); Le-Xuan Diec, Berkeley, CA (US); Joana Cabrera, San Francisco, CA (US); Mark Patrick Cyffka, El Cerrito, CA (US); Sudip Mukhopadhyay, Berkeley, CA (US)

(73) Assignee: AirMyne, Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,315

(22) Filed: Dec. 29, 2022

(65) Prior Publication Data

US 2023/0211287 A1 Jul. 6, 2023

Related U.S. Application Data

(63) Continuation-in-part of application No. 17/948,492, filed on Sep. 20, 2022, now Pat. No. 11,612,853.
(Continued)

(51) Int. Cl.
  *B01D 53/14* (2006.01)
  *B01D 53/18* (2006.01)
(Continued)

(52) U.S. Cl.
  CPC ..... *B01D 53/8671* (2013.01); *B01D 53/1412* (2013.01); *B01D 53/1418* (2013.01);
(Continued)

(58) Field of Classification Search
  CPC ............ B01D 53/8671; B01D 53/1412; B01D 53/1418; B01D 53/73; B01D 53/18;
(Continued)

(56) References Cited

U.S. PATENT DOCUMENTS

| | | | | |
|---|---|---|---|---|
| 4,012,206 A | * | 3/1977 | Macriss | ............... F24F 3/1423 95/137 |
| 5,215,498 A | | 6/1993 | Wong | ................... F24F 11/0001 236/44 C |

(Continued)

FOREIGN PATENT DOCUMENTS

| | | |
|---|---|---|
| CN | 107101407 A | 8/2017 |
| CN | 108458512 A | 8/2018 |

(Continued)

*Primary Examiner* — Timothy C Vanoy
(74) *Attorney, Agent, or Firm* — Adibi IP Group, PC; Amir V. Adibi; Andrew C. Palmer

(57) ABSTRACT

An efficient low-energy carbon dioxide removal system comprises an automated air mover equipped with sensing devices to measure flow rate, volume, level, pressure, temperature and concentration. Packing materials and air-liquid distributors are used in a multi-stage catalytic reactor. The multi-stage catalytic reactor processes ambient air and generates pure carbon dioxide gas and generates exhausted gas released to ambient air. In operation, air contacts the base solution in the presence of a catalyst via the air mover, distributor, and packing materials. The air reacts with the base solution thereby generating a base solution having carbon dioxide and generating exhaust (absorption reaction). Next, the exhaust is released from the reactor. Next, a catalyst is added, heat is applied to the base solution having
(Continued)

CARBON PROCESSING SYSTEM carbon dioxide thereby generating carbon dioxide and generating a base solution without carbon dioxide (desorption reaction).

30 Claims, 4 Drawing Sheets

Related U.S. Application Data

(60) Provisional application No. 63/295,942, filed on Jan. 2, 2022.

(51) Int. Cl.
*B01D 53/73* (2006.01)
*B01D 53/86* (2006.01)

(52) U.S. Cl.
CPC ............. *B01D 53/18* (2013.01); *B01D 53/73* (2013.01); *B01D 2257/504* (2013.01); *B01D 2259/40088* (2013.01)

(58) Field of Classification Search
CPC .... B01D 2259/40088; B01D 2257/504; B01D 53/1425; B01D 53/78; B01D 53/005; B01D 53/75; B01D 53/1475; B01D 2252/103; B01D 2221/16; B01D 53/50; B01D 53/502; B01D 53/62; A61L 9/145; A61L 9/14; A61L 9/00; Y02A 50/20; F24F 2110/70; F24F 2110/50; F24F 8/117; F24F 8/125; F24F 8/133; F24F 8/90; F24F 8/95; Y02C 20/40; Y02B 30/62; Y02B 90/00

See application file for complete search history.

(56) References Cited

U.S. PATENT DOCUMENTS

| | | | |
|---|---|---|---|
| 5,221,520 A * | 6/1993 | Cornwell | A61L 9/16 422/4 |
| 2007/0271943 A1 | 11/2007 | Baruschke | F25B 13/00 62/324.6 |
| 2009/0120288 A1 | 5/2009 | Lackner | B01D 53/0462 95/68 |
| 2013/0230442 A1 | 9/2013 | Wei et al. | B01D 53/62 423/228 |
| 2015/0258488 A1 | 9/2015 | Meirav | F24F 13/00 96/144 |
| 2017/0252693 A1 | 9/2017 | Kuroda | F24F 8/15 |
| 2017/0256812 A1 | 9/2017 | Yoon | H01M 8/1004 |
| 2019/0039047 A1 | 2/2019 | Kimura et al. | B01J 20/32 |
| 2019/0193019 A1 | 6/2019 | Okano | B01D 53/06 |
| 2020/0114306 A1* | 4/2020 | Miyamoto | B01D 53/1418 |
| 2020/0206675 A1 | 7/2020 | Kim | F24F 11/0001 |
| 2022/0176312 A1* | 6/2022 | Olmstead | B01D 53/1475 |
| 2022/0193606 A1* | 6/2022 | Nold | B01J 4/002 |

FOREIGN PATENT DOCUMENTS

| | | | |
|---|---|---|---|
| CN | 112126477 A | 12/2020 | |
| CN | 113405164 A | 9/2021 | |
| CN | 114777277 A | 7/2022 | |
| EP | 3842700 A1 | 6/2021 | |
| GB | 2592707 A | 8/2021 | |
| KR | 20060064344 A | 6/2006 | |
| KR | 101811957 B1 | 12/2017 | |
| KR | 20220068445 | 5/2022 | |
| WO | 2005108297 A2 | 5/2005 | |
| WO | 2011151549 A1 | 12/2011 | |
| WO | 2019161114 A1 | 8/2019 | |
| WO | WO 2011 150 722 A1 * | 7/2021 | ............. B01D 53/06 |

* cited by examiner

CARBON PROCESSING SYSTEM

**REACTION DURING FIRST STAGE OF REACTOR
(ABSORPTION REACTION)**

**REACTION IN SECOND STAGE OF REACTOR
(DESORPTION REACTION)**

CARBON PROCESSING SYSTEM

EFFICIENT AND FULLY AUTOMATED CATALYTIC DIRECT CARBON DIOXIDE CAPTURE FROM AIR SYSTEM

CROSS REFERENCE TO RELATED APPLICATIONS

This application is a continuation-in-part, and claims the benefit under 35 U.S.C. § 120 from U.S. Nonprovisional patent application Ser. No. 17/948,492, entitled "Fully Automated Direct Air Capture Carbon Dioxide Processing System," filed on Sep. 20, 2022. U.S. Nonprovisional patent application Ser. No. 17/948,492 claims the benefit under 35 U.S.C. § 119 from U.S. Provisional Patent Application Ser. No. 63/295,942, entitled "Fully Automated Direct Air Capture Carbon Dioxide Processing System," filed on Jan. 2, 2022. This application also claims the benefit under 35 U.S.C. § 119 from U.S. Provisional Patent Application Ser. No. 63/295,942, entitled "Fully Automated Direct Air Capture Carbon Dioxide Processing System," filed on Jan. 2, 2022. The subject matter of each of the foregoing documents is expressly incorporated herein by reference.

TECHNICAL FIELD

The present invention relates generally to scalable large-scale industrial carbon dioxide removal processing systems, and more specifically, to a system for efficient carbon dioxide removal from air.

BACKGROUND INFORMATION

In chemical manufacturing plants and downstream refinery processes, acidic gasses, including $H_2S$ and $CO_2$, are quite often removed from a mixture of flue gasses with 15 to 50-wt % concentration using amine or metal carbonates as used in natural gas sweetening processes. Amine or Carbonate react with $CO_2$ gas to form a salt, which can be reversibly broken into starting amine or carbonate and acidic gas at mildly elevated temperatures. Although this process is used for the industrial-scale removal of flue gasses with $H_2S$ or carbon dioxide ($CO_2$) in manufacturing plants, it has yet to be applied for direct $CO_2$ removal from air, where the concentration of $CO_2$ is limited to anywhere between 200 to 1000 ppm.

SUMMARY

In various exemplary embodiments, a system providing a scalable, efficient, and fully automated catalytic direct carbon dioxide capture from air is disclosed. In one embodiment, a carbon processing system comprises an air mover, packing materials, fully automated remote sensing devices for flow rate, pressure, temperature and levels, water condensing systems, and a multi-stage reactor. The multi-stage reactor processes ambient air and generates carbon dioxide and generates exhausted gas released to ambient. The carbon dioxide that is generated is usable in sequestration, low global warming mobile and stationary refrigerants, low global warming industrial refrigerants, cements, feedstock, or starting material for the manufacture of useful chemicals including urea, methanol, formaldehyde, esters, ethers, hydrocarbons, polymers, plastics, and carbon monoxide, or in production of commodity carbon dioxide-derived materials, such as dry ice.

Thus, a novel process is provided using $M^{2+}CO_3^{2-}$ (where "M" is $Na^+$, $K^+$, $Li^+$, $NH4^+$, quaternary ammonium$^+$, salts of amino acids, or melamine) in a liquid solvent including water, alcohols, and glycols solution in the presence of packing materials, both absorption and desorption catalysts to capture $CO_2$ directly from the air at high conversions and selectivity. The carbon processing system uses a base medium that is regenerated during the novel process and reused during each carbon processing cycle. This provides for significant automation capabilities and scalability of the carbon processing system.

In one embodiment, a method is provided for carbon processing. First, airflow is generated over a packing material. The packing material provides a distributed surface area that accepts a base medium. The packing material is generated using additive or subtractive manufacturing techniques, such as a three-dimensional (3D) printing process. Next, the packing material is continuously coated with a base medium until the base medium acquires a first concentration of carbon dioxide. Next, the base medium having the first concentration of carbon dioxide is heated to remove the carbon dioxide.

In one embodiment, an apparatus is provided for carbon processing. The apparatus comprises an air mover, a pump, and a heated reservoir. The air mover generates airflow over a packing material. The pump continuously coats the packing material with a base medium until the base medium acquires a first concentration of carbon dioxide. The heated reservoir heats the base medium having the first concentration of carbon dioxide to remove the carbon dioxide.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
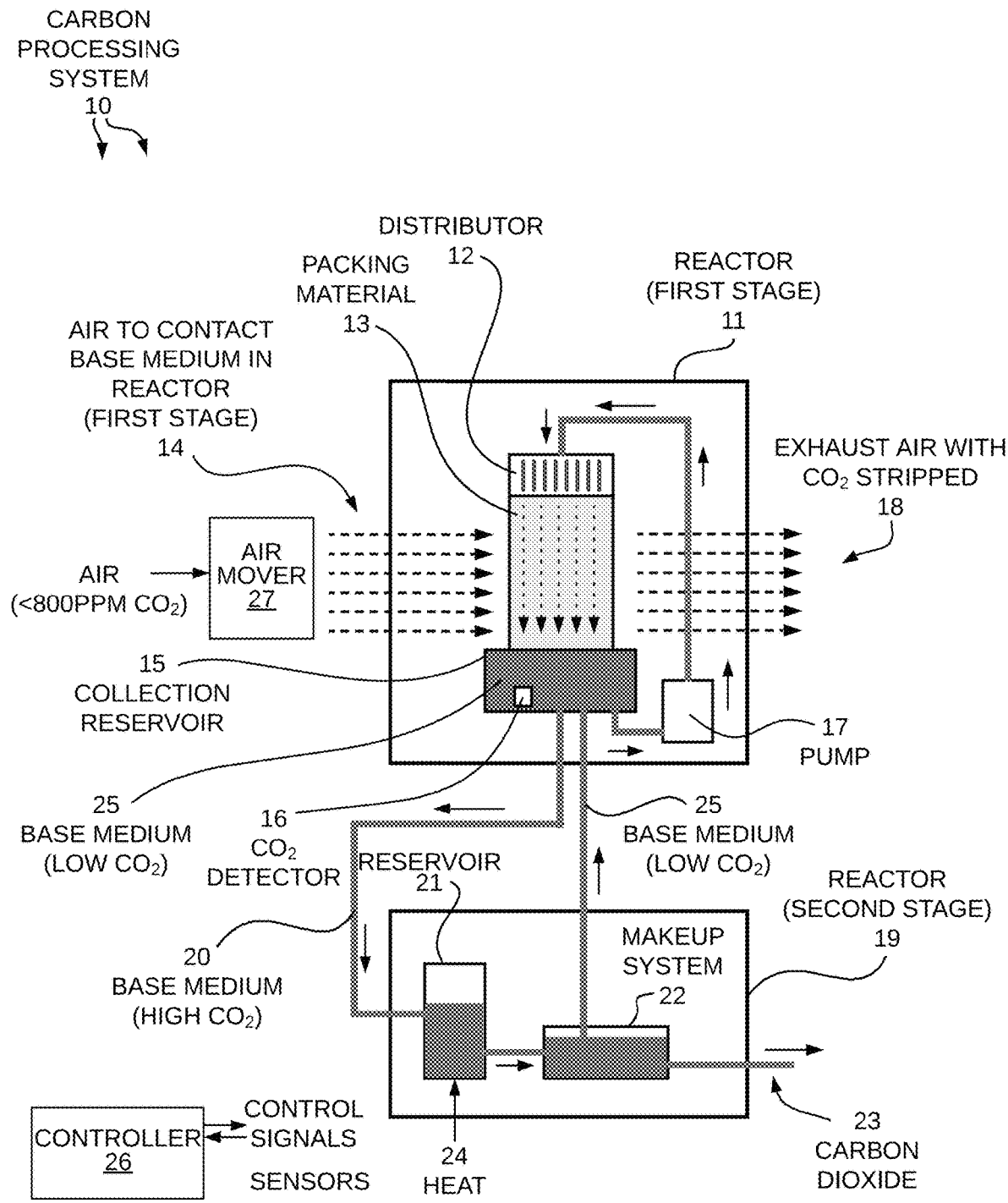
FIG. 1 is a diagram of a carbon processing system.

FIG. 1 is a diagram of a carbon processing system 10. The carbon processing system 10 comprises air mover 27 and a multi-stage reactor having a first stage 11 and a second stage 19. The first stage 11 comprises packing material 13, distributor 12, collection reservoir 15, and pump 17. The second stage 19 comprises reservoir 21 and makeup system 22. The system 10 also includes a controller 26 that receives inputs from various sensors and provides outputs to valves and other control mechanisms to control the operation and processing of the first 11 and second 19 stages.

In one embodiment, the carbon processing system 10 employs direct air-capture techniques. For example, the carbon processing system 10 uses the air mover 27 to provide air 14 to the system 10 for processing. The air mover 27 comprises at least one of a compressor, a blower, a fan, a turbofan, a pump, a diaphragm pump, an air contactor, a falling-film evaporator, or an absorber. The multi-stage reactor involves a single container or two or more containers that provide the multi-stage functionality.

The multi-stage reactor includes a base medium 25. The base medium comprises water, alcohol, and glycols containing a dissolved salt of the form $M_2^{2+}CO_3^{2-}$. The symbol "M" in this general equation is the cation species, and in one example, is $K^+$, $Na^+$, $Li^+$, $NH_4^+$, or a quaternary ammonium cation taken from the group consisting of $N(CH_3)^{4+}$, $N(ethylmethyl)_4^+$, $N(Butyl)_4^+$, or their mixtures.

In other embodiments, the base medium 25 includes catalysts or promoters. Sodium, Potassium, or Ammonium salts of amino acids, such as Glycine, Proline, Arginine, and Guanidine, are used as promoters to double, and in some cases, triple the rate of the absorption reaction. A 0.1 to 5% by weight concentration is sufficient. However, 40 to 60% of their aqueous solutions are also used as base without the presence of carbonates.

During operation, the air mover 27 moves air 14 having less than 800 PPM of $CO_2$ over the packing material 13. The pump 17 pumps base medium 25 from the collection reservoir 15 up to the distributor 12, which evenly distributes the base medium 25 over the packing material 13. Excess base medium 25 on the packing material 13 flows back into the collection reservoir 15. Thus, the pump 17 continuously circulates base medium 25 from the collection reservoir 15 up to the distributor 12 and over the packing material 13.

As the base medium 25 is distributed over the packing material 13, the airflow 14 across the packing material 13 results in $CO_2$ being removed from the airflow 14. As a result, the $CO_2$ is captured within the base medium 25. The $CO_2$ concentration of the base medium 25 within the collection reservoir 15 begins to increase and the $CO_2$ concentration of the exhaust air 18 decreases.

In one embodiment, a $CO_2$ detector 16 detects the concentration of $CO_2$ within the base medium 25. When the concentration of $CO_2$ reaches a threshold level, the base medium 25 within the collection reservoir 15 is moved to the reservoir 21 of the second stage 19. In one embodiment, additional base medium is then added to the collection reservoir 15.

In the second stage 19, heat 24 is applied to the carbon dioxide-rich base medium to extract the carbon dioxide 23. A catalyst is used to facilitate the desorption process. The output of reservoir 21 flows through a makeup system 22 that regenerates the base medium without carbon dioxide 25, which flows back to the collection reservoir 15. The base medium 25 without carbon dioxide is reusable in processing new air. The extracted carbon dioxide 23 is then output from the second stage 19. The absorption reaction of the first stage 11 and desorption reaction of the second stage 19 are reversible reactions resulting in regeneration of the base medium into its form prior to contacting the air.

The carbon processing system 100 is highly scalable and consumes less processing volume than is required by many conventional carbon processing techniques.

Figure 2:
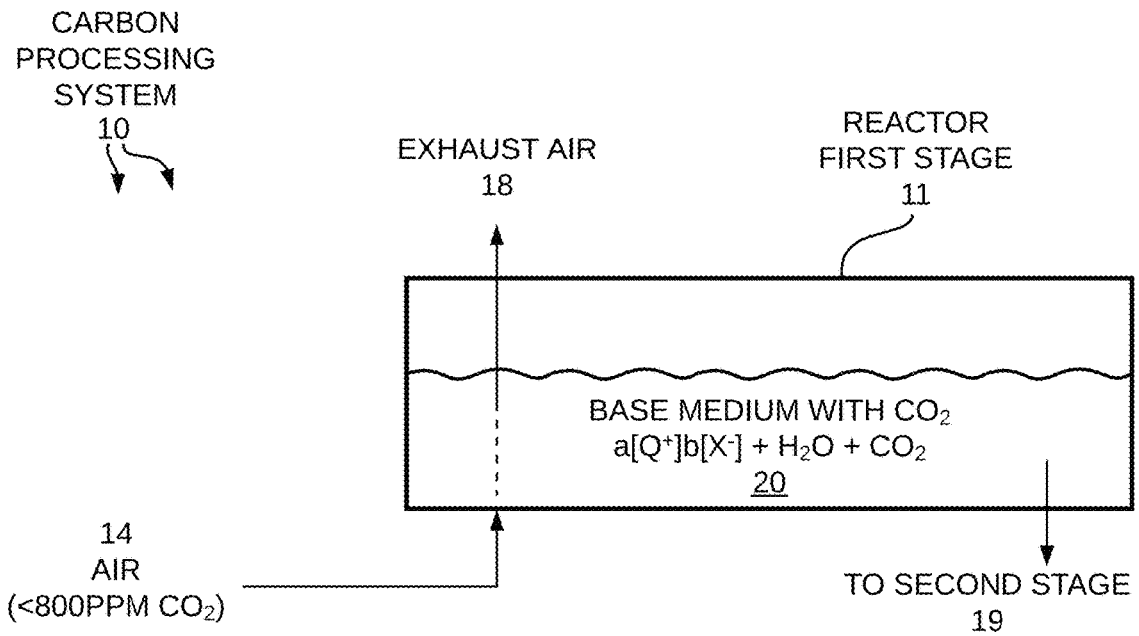
FIG. 2 is a functional diagram of the first stage (absorption stage) of the carbon processing system.

FIG. 2 is a functional diagram of the first stage 11 (absorption stage) of the carbon processing system 10. During operation, air 14 comes in contact with the base medium, which extracts carbon dioxide to form a base medium 20 having a high concentration of $CO_2$. The exhaust air 18 with reduced $CO_2$ levels is expelled. The base medium 20 having a high concentration of $CO_2$ is moved to the second stage 19 of the reactor.

Figure 3:
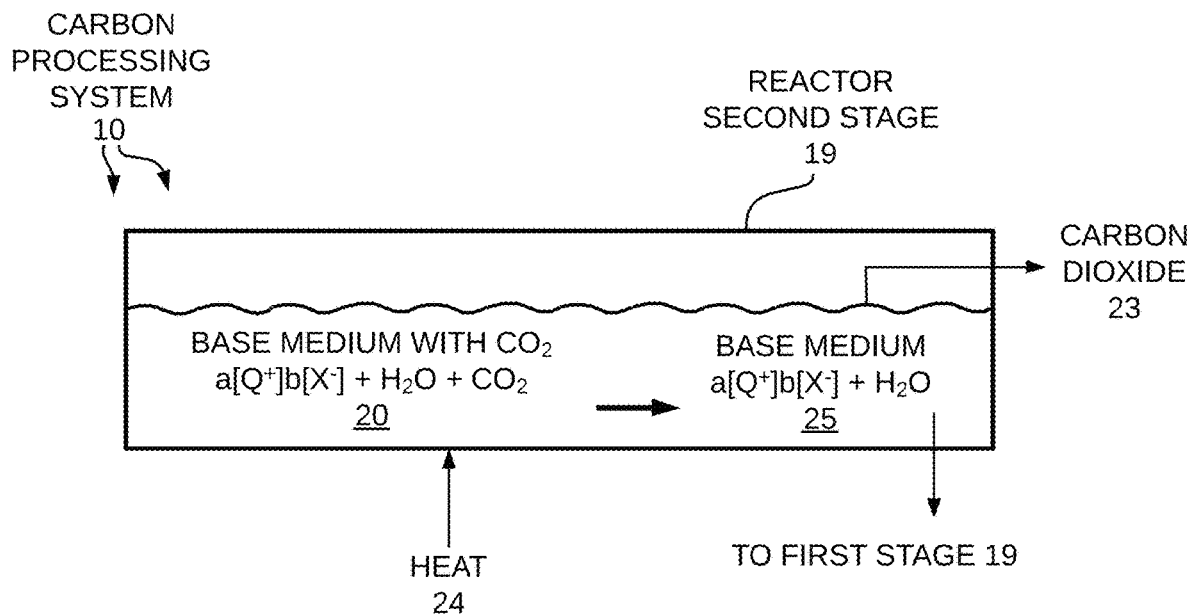
FIG. 3 is a functional diagram of the second stage (desorption stage) of the carbon processing system.

FIG. 3 is a functional diagram of the second stage 19 (desorption stage) of the carbon processing system 10. During operation, heat 24 is applied to the base medium 20 having a high concentration of $CO_2$ to extract carbon dioxide 23. The base medium 25 is returned to its original state without $CO_2$ and returned to the first stage 19.

Figure 4:
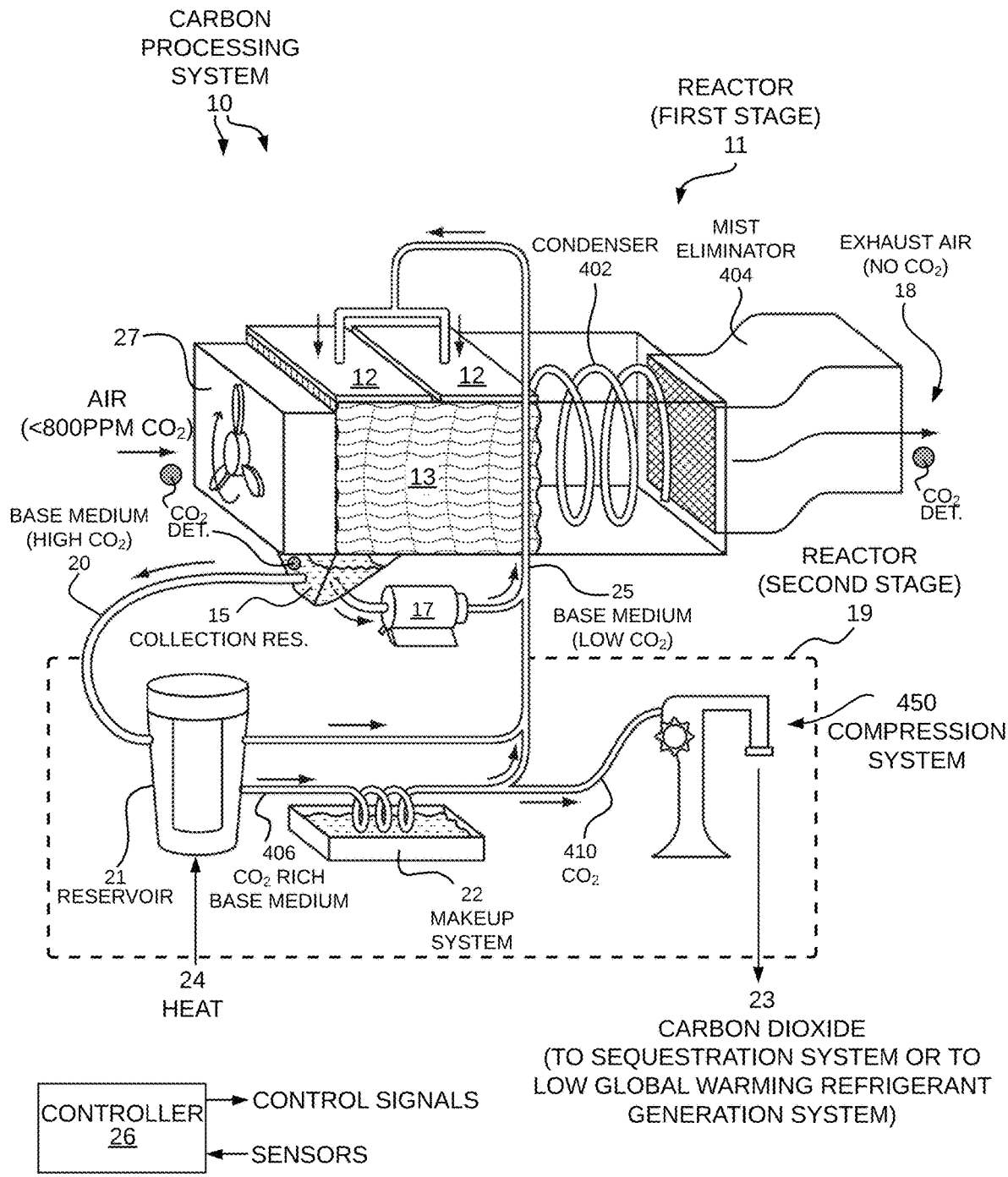
FIG. 4 is a detailed embodiment of the carbon processing system.

FIG. 4 is a detailed embodiment of the carbon processing system 10. FIG. 4 shows the first stage reactor 11 and the second stage reactor 19 of the carbon processing system 10. The first stage reactor 11 comprises fan 11, distributors 12, packing material 13, condenser 402, mist eliminator 404, collection reservoir 15, and pump 17. The second stage reactor 19 comprises reservoir 21 and makeup system 22.

In various embodiments, packing material 13 comprises film fill that is designed to put as much base medium surface area in contact with as much air as possible, for the longest amount of time. Film fills allow the base medium to form thin flowing sheets to expose as much base medium surface area as possible to the interacting airflow. A variety of commercially available film fill products are suitable for use with embodiments of the carbon processing system 10.

In various embodiments, the base medium is formed in one or more different configurations and includes one or more catalysts to facilitate $CO_2$ absorption. The controller 26 operates to output control signals that are used to control the various operations of the first 11 and second 19 stages. The controller 26 also receives sensor inputs from various sensors (e.g., $CO_2$, temperature, etc.) and detectors used to monitor operations of the first 11 and second 19 stages.

During operation, the pump 17 pulls base medium having a low $CO_2$ concentration 25 from the collection reservoir 15 and provides the base medium 25 to the distributors 12, which evenly distributes the base medium 25 over the packing material 13. The fan 11 moves air across the packing material 13 so that $CO_2$ in the air is captured by the base medium 25 flowing over the packing material 13. As the airflow leaves the packing material 13, it moves past the condenser 402 which condenses any medium in the air and returns it to the collection reservoir 15. The mist eliminator 404 eliminates any base medium mist that may still be in the airflow. The exhaust air 18 is released having low or no $CO_2$.

Once the $CO_2$ concentration of the base medium 25 meets a threshold level, the base medium with high $CO_2$ concentration 20 is moved to the reservoir 21 of the second stage reactor 19. A catalyst is also added to the reservoir 21 to facilitate $CO_2$ absorption. Heat 24 is applied to the reservoir 21 to extract a portion of the base medium with low $CO_2$ concentration 25 and $CO_2$-rich base medium 406. The makeup system 22 separates $CO_2$ 410 from the base medium 25, which is returned to the first stage reactor 11. The makeup system 22 also makes up for the liquid volume loss by adding liquid medium to the base medium with low $CO_2$ concentration 25. The $CO_2$ 410 extracted from the base medium 25 is then compressed in stages to supercritical carbon dioxide or liquid carbon dioxide 23 in a compression system 450. The carbon dioxide 23 is supplied to a sequestration system, used as a low global warming refrigerant, or output for use in any suitable application.

Figure 5:
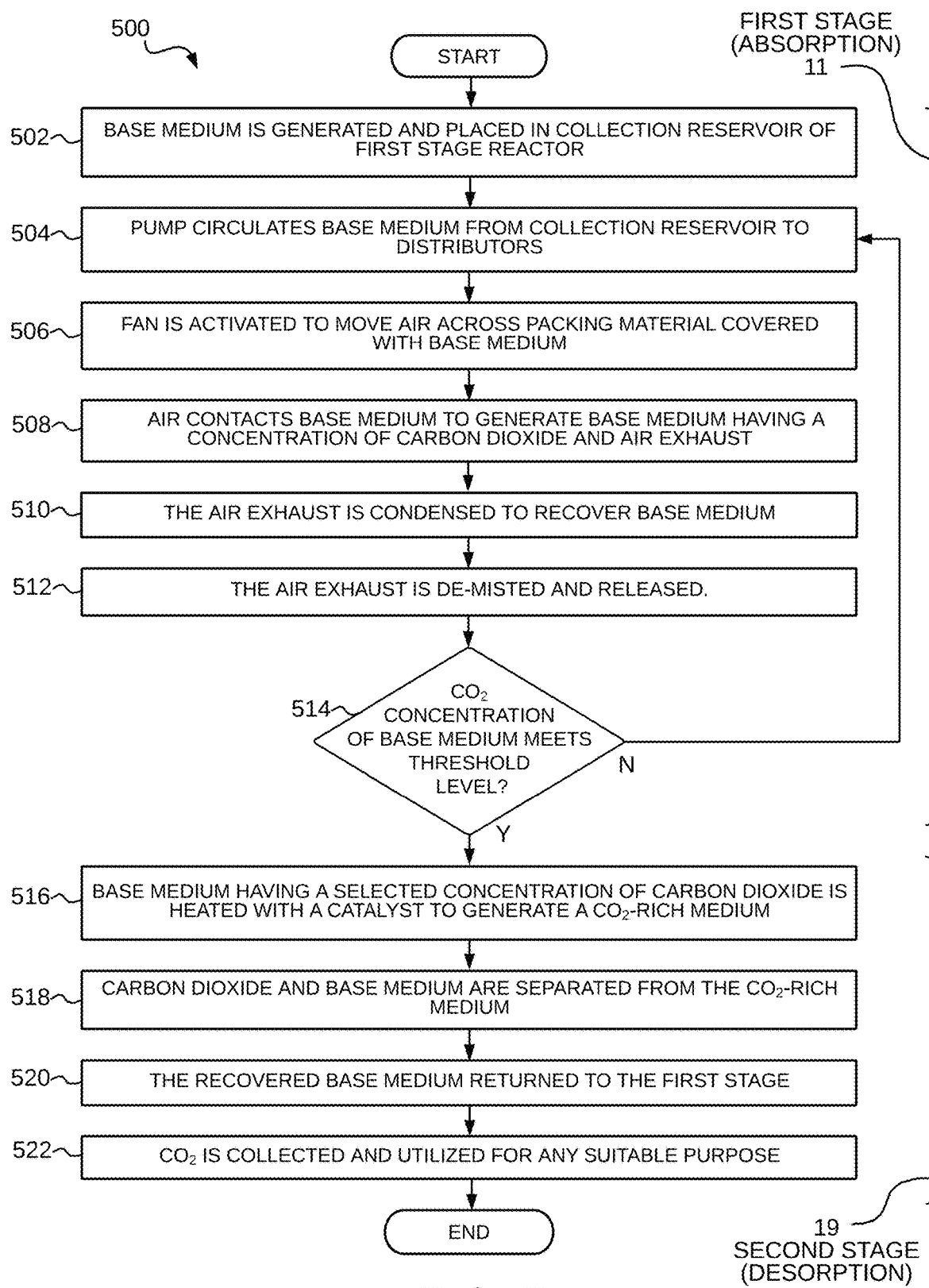
FIG. 5 is a flowchart of a method for processing carbon in accordance with one embodiment of a carbon processing system.

FIG. 5 is a flowchart of a method 500 for processing carbon in accordance with one embodiment of a carbon processing system. The method 500 includes operations performed by a first stage (absorption) 11 and operations performed by a second stage (desorption) 19. In one embodiment, the method 500 is performed by the carbon processing system 10.

At block 502, a base medium is generated and placed into a collection reservoir of a first stage of a carbon processing system. For example, the base medium 25 is generated according to any of the embodiments disclosed herein and placed in the collection reservoir 15 of the first stage reactor 11.

At block 504, a pump circulates the base medium from the collection reservoir to distributors that distribute the base medium over a packing material. For example, pump 17 distributes the base medium 25 up to the distributors 12 that distribute the base medium 25 over the package material 13.

At block 506, an air mover is activated to move air over the packing material. For example, fan 11 moves air having a concentration of $CO_2$ over the packing material 13, which is covered with the base medium 25.

At block 508, air contacts with the base medium. For example, the air contacts the base medium 25 on the packing material 13 and $CO_2$ in the air is captured by the base medium 25.

At block 510, air exhaust is condensed to recover the base medium. For example, the air flowing from the packing material 13 flows by the condenser 402 and base medium 20 that is received by the condenser 402 is returned to the collection reservoir 15.

At block 512, the air exhaust is de-misted and released. For example, the air flowing from the condenser 402 is de-misted by the mist eliminator 404 and then the air with no or reduced $CO_2$ concentration 18 is released.

At block 514, a determination is made as to whether the CO2 concentration of the base medium meets a threshold level. For example, the controller 26 receives various sensor inputs and determines when the concentration of $CO_2$ in the base medium meets the threshold level. The threshold level can be set to any suitable level. For example, the controller 26 receives $CO_2$ detection levels in the collection reservoir 15, input airflow, and exhaust airflow 18. The controller 26 uses detected $CO_2$ levels to determine when the base medium has a $CO_2$ concentration that meets the threshold level. The controller 26 also receives a variety of sensor inputs, such as temperature sensors, fluid level sensor, and other sensor inputs and uses these inputs to determine operation of the system and determine when the base medium meets the $CO_2$ concentration threshold level. If the concentration of the base medium does not exceed the threshold level, the method proceeds to block 504. If the $CO_2$ concentration of the base medium exceeds the threshold level, the method proceeds to block 516.

At block 516, the base medium with the concentration of $CO_2$ that exceeds the threshold level is heated with a catalyst to generate a $CO_2$-rich medium. For example, the $CO_2$-rich medium 406 is generated.

At block 518, carbon dioxide and base medium are separated from the $CO_2$-rich medium. For example, the makeup system 22 separates carbon dioxide 23 and base medium 25 from the $CO_2$-rich medium 406.

At block 520, the recovered base medium is returned to the first stage. For example, the base medium with low $CO_2$ 25 is returned to the first stage 11.

At block 522, the $CO_2$ is collected and utilized for any suitable purpose. For example, the $CO_2$ 25 is collected for further use.

Thus, the method 500 operates to provide carbon dioxide processing to remove $CO_2$ from air. It should be noted that the operations of method 500 are exemplary and that the operations can be added to, deleted, rearranged, or otherwise modified within the scope of the embodiments.

Various embodiments for generating base medium and catalysts for use by the novel carbon processing system are discussed below. It is appreciated that minor changes or adjustments exist within the scope of the embodiments.

Embodiment #1

In a first embodiment, the base medium comprises one kg-mole of $M_2^{2+}CO_3^{2-}$ (where "M" is $Na^+$, $K^+$, $Li^+$, $NH_4^+$, or quaternary ammonium$^+$) base mixed with water to make an aqueous solution with a concentration anywhere between 1%-100% by weight. More specifically, the concentration is between 20-80% by weight or between 20-40% by weight. A 0.1-5 wt % of a catalyst comprising an amino acid salt, such as glycine, is added into the solution.

One kg-mole of pure $CO_2$ (99.9% purity) is brought into contact with the aqueous solution in an autoclave under stirring at a temperature between 5° C.-110° C. More specifically the temperature is between 10° C.-60° C. or between 40-70° C. When most of the $CO_2$ is absorbed by the solution, the overhead pressure of the autoclave is released. A 0.1-5-wt % of a freshly prepared catalyst of the general formula M-O—(OH)$_n$ is added where "M" is Cr, V, Ti and/or Mo and "n" is an integer between one (1) and six (6).

A steam-jacketed desorber is then heated to between 50-150° C. More specifically the desorber is heated between 60-130° C. or between 70-125° C. to desorb $CO_2$. The overhead pure $CO_2$ is bottled for injection. The conversion and selectivity in the absorption step were 100% and 100% and the conversion and selectivity in the desorption step were around 90-100% and 99.99% respectively.

Embodiment #2

In a second embodiment, the base medium comprises one kg-mole of $M_2^{2+}CO_3^{2-}$ (where M=Na+, K+, Li+, NH$_4$+, quaternary ammonium+) base mixed with water to make an aqueous solution with a concentration anywhere between 1%-100% by weight. More specifically, the concentration is between 20-80% by weight or between 20-40% by weight. A 0.1-5 wt % of a catalyst comprising an amino acid salt, such as glycine, is added into the solution.

One kg-mole of $CO_2$ in an air stream with 400 ppm of $CO_2$ concentration is brought in contact with the aqueous solution over time in a continuous flow reactor at a temperature between 5° C.-110° C. More specifically, the temperature is between 10° C.-60° C. or between 40-50° C. When most of the $CO_2$ is absorbed by the solution, the overhead pressure is released. A 0.1-5 wt % of a freshly prepared catalyst of the general formula M-O—(OH)n is added where M=Cr, V, Ti and/or Mo and n=1-6).

A steam-jacketed desorber is then heated to between 50-150° C. More specifically, the desorber is heated between 60-130° C. or between 70-125° C. to desorb $CO_2$. The overhead pure $CO_2$ is bottled for injection. The conversion and selectivity in the absorption step were 30-70% and 99%, and the conversion and selectivity in the desorption step were around 70-100% and 99% respectively.

Embodiment #3

In a third embodiment, the base medium comprises one kg-mole of $M_2^{2+}CO_3^{2-}$ (where M is $Na^+$, $K^+$, $Li^+$, $NH_4^+$, or quaternary ammonium$^+$) base mixed with water to make an aqueous solution with a concentration anywhere between 1%-100% by weight. More specifically, the concentration is between 20-80% by weight or between 20-40% by weight. A 0.1-5 wt % of a catalyst comprising an amino acid salt, such as glycine, is added into the solution.

One Kg-mole equivalent of $CO_2$ in flue gas stream with 10-35% by weight $CO_2$ concentration is brought in contact with the aqueous solution over time in a continuous flow reactor at a temperature between 5° C.-110° C. More specifically, the temperature is between 10° C.-60° C. or between 40-70° C. When most of the $CO_2$ is absorbed by the solution, the overhead pressure is released. A 0.1-5 wt % of a freshly prepared catalyst of the general formula M-O—$(OH)_n$ is added where "M" is Cr, V, Ti and/or Mo and "n" is an integer between one and six).

A steam-jacketed desorber is then heated to between 50-150° C. More specifically, the desorber is heated between 60-130° C. or between 70-125° C. to desorb $CO_2$. The overhead pure $CO_2$ is bottled for injection. The conversion and selectivity in the absorption step were 30-70% and 99%, and the conversion and selectivity in the desorption step were around 70-100% and 99% respectively.

Embodiment #4

In a fourth embodiment, the configuration is the same as in Embodiment #2, but instead of using an air-liquid contactor, a bubble column reactor was used to achieve 85-90% conversion and 99% selectivity.

Embodiment #5

In a fifth embodiment, the configuration is the same as in Embodiment #2, except that a 50%-50% by weight mixture of water and glycol was used as the solvent instead of 100% water. Conversion and selectivity to $CO_2$ was similar to Embodiment #2; however, the water loss was minimized to 1-3% instead of the usual 5-7%.

Embodiment #6

In a sixth embodiment, the configuration is the same as in Embodiment #2, except that a 50%-50% by weight mixture of water and alcohol was used as the solvent instead of 100% water. Conversion and selectivity to $CO_2$ was similar to Embodiment #2.

Embodiment #7

In a seventh embodiment, the configuration is the same as in Embodiment #2, except that a 50%-50% by weight mixture of water and PGMEA was used as the solvent instead of 100% water. Conversion and selectivity to $CO_2$ was similar to Embodiment #2, but water loss was limited to 3%.

Embodiment #8

In an eighth embodiment, the base medium comprises one kg-mole of $Q^+X^-$ (where Q=tetramethyl quaternary ammonium, tetraethyl quaternary ammonium, ethyl trimethyl quaternary ammonium, tetrabutyl quaternary ammonium, methyltribuyl quaternary ammonium, methylethyldibutyl quaternary ammonium cation and X=$OH^-$) base mixed with water to make an aqueous solution with a concentration anywhere between 1%-100% by weight. More specifically, the concentration is between 20-80% by wt or between 20-40% by weight. A 0.1-5 wt % of a catalyst comprising an amino acid salt, such as glycine, is added into the solution.

One Kg-mole of $CO_2$ equivalent in an air stream with 400 ppm of $CO_2$ concentration is brought in contact with the aqueous solution over time in a continuous flow reactor at a temperature between 5° C.-110° C. More specifically, between 10° C.-60° C. or between 40-50° C. When most of the $CO_2$ is absorbed by the solution, the overhead pressure is released. A 0.1-5 wt % of a freshly prepared catalyst of the general formula M-O—$(OH)_n$ is added where "M" is Cr, V, Ti and/or Mo and "n" is an integer between one and six.

A steam-jacketed desorber is then heated to between 50-150° C. More specifically, the desorber is heated between 60-130° C. or between 70-120° C. to desorb $CO_2$. The overhead pure $CO_2$ is bottled for injection. The conversion and selectivity in the absorption step were 50-90% and 99%, and the conversion and selectivity in the desorption step were around 70-90% and 99% respectively.

Embodiment #9

In a ninth embodiment, the base medium comprises one kg-mole of $Q^+X^-$ (where Q=tetramethyl quaternary ammonium, tetraethyl quaternary ammonium, ethyl trimethyl quaternary ammonium, tetrabutyl quaternary ammonium, methyltribuyl quaternary ammonium, or methylethyldibuyl quaternary ammonium cation and X=$OH^-$) base mixed with water and glycerol to make an aqueous solution with a concentration anywhere between 1%-100% by weight. More specifically, the concentration is between 20-80% by weight or between 20-40% by weight. A 0.1-5 wt % of a catalyst comprising an amino acid salt, such as glycine, proline or guanidine, is added into the solution.

One Kg-mole of $CO_2$ equivalent in a flue gas stream with 5-35-wt % $CO_2$ concentration is brought in contact with the aqueous solution over time in a continuous flow reactor at a temperature between 5° C.-110° C. More specifically, the temperature is between 10° C.-60° C. or between 50-75° C. When most of the $CO_2$ is absorbed by the solution, the overhead pressure is released. A 0.1-5 wt % of a freshly prepared catalyst of the general formula M-O—$(OH)_n$ is added where M=Cr, V, Ti and/or Mo and n=1-6).

A steam-jacketed desorber is then heated to between 50-150° C. More specifically, the desorber is heated between 60-130° C. or between 70-130° C. to desorb $CO_2$. The overhead pure $CO_2$ is bottled for injection. The conversion and selectivity in the absorption step were 80-100% and 99%, and the conversion and selectivity in the desorption step were around 90-100% and 99.9% respectively.

Embodiment #10

In a tenth embodiment, the configuration is the same as in Embodiment #8 but instead of an air-liquid contactor, a bubble column reactor is used to achieve 85-90% conversion and 99% selectivity.

Embodiment #11

In an eleventh embodiment, the configuration is the same as in Embodiment #8, except that a 50%-50% by weight mixture of water and glycol was used as the solvent instead of 100% water. Conversion and selectivity to $CO_2$ was similar to Embodiment #2; however, the water loss was minimized to 1-3% instead of the usual 5-7%.

Embodiment #12

In a twelfth embodiment, the configuration is the same as in Embodiment #8 except that a 50%-50% by weight mixture of water and alcohol was used as the solvent instead of 100% water. Conversion and selectivity to $CO_2$ was similar to Embodiment #2.

Embodiment #13

In a thirteenth embodiment, the configuration is the same as in Embodiment #8, except that a 50%-50% by weight mixture of water and PGMEA was used as the solvent instead of 100% water. Conversion and selectivity to $CO_2$ was similar to Embodiment #2, but water loss was limited to 3%.

Embodiment #14

In a fourteenth embodiment, the base medium comprises one kg-mole of $M_2^{2+}CO_3^{2-}$ (where M=Na+, K+, Li+, $NH_4$+, quaternary ammonium+) base, 0.1-1 wt % of glycine, 0.1-1 wt % of tetrabutylammonium hydroxide mixed with water-Glycerol solvent mixture to make an aqueous solution with a concentration anywhere between 1%-100% by weight. More specifically the concentration is between 20-80% by weight or between 20-40% by weight.

One Kg-mole of $CO_2$ in an air stream with 400 ppm of $CO_2$ concentration is brought in contact with the aqueous solution over time in a continuous flow reactor at a temperature between 5° C.-110° C. More specifically, the temperature is between 10-75° C. or between 50-70° C. When most of the $CO_2$ is absorbed by the solution, the overhead pressure is released. A 0.1-5 wt % of a freshly prepared catalyst of the general formula $M-O-(OH)_n$ is added where "M" is Cr, V, Ti and/or Mo and "n" is an integer between one and six.

A steam-jacketed desorber is then heated to between 50-150° C. More specifically, the desorber is heated between 60-130° C. or between 70-120° C. to desorb $CO_2$. The overhead pure $CO_2$ is bottled for injection. The conversion and selectivity in the absorption step were 30-70% and 99%, and the conversion and selectivity in the desorption step were around 70-100% and 99% respectively.

Embodiment #15

In a fifthteenth embodiment, the base medium comprises one kg-mole of $Q^+X^-$ (where $Q^+$=tetramethyl quaternary ammonium cation, tetraethyl quaternary ammonium cation, ethyl trimethyl quaternary ammonium cation, tetrabutyl quaternary ammonium cation, methyl tributyl quaternary ammonium cation, methylethyldibuyl quaternary ammonium cation, ammonium cation and $X^-$=hydroxide anion) base, 0.1-1 wt % of glycine, 0.1-1 wt % of KOH mixed with water-Glycerol solvent mixture to make an aqueous solution with a concentration anywhere between 1%-100% by weight. More specifically, the concentration is between 20-80% by weight or between 20-40% by weight.

One Kg-mole of $CO_2$ in an air stream with 400 ppm of $CO_2$ concentration is brought in contact with the aqueous solution over time in a continuous flow reactor at a temperature between 5-110° C. More specifically, the temperature is between 10-75° C. or between 50-70° C. When most of the $CO_2$ is absorbed by the solution, the overhead pressure is released. A 0.1-2 wt % of a freshly prepared catalyst of the general formula $M-O-(OH)_n$ is added where M=Cr, V, Ti and/or Mo and n=1-6).

A steam-jacketed desorber is then heated to between 50-150° C. More specifically, the desorber is heated to between 60-130° C. or between 70-120° C. to desorb $CO_2$. The overhead pure $CO_2$ is bottled for injection. The conversion and selectivity in the absorption step were 30-70% and 99%, and the conversion and selectivity in the desorption step were around 70-100% and 99% respectively.

Embodiment #16

In a sixteenth embodiment, the base medium comprises one kg-mole of sodium, potassium and ammonium salts or free forms of glycine, proline, and guanidine or their mixture in water or water-Glycerol solvent mixture to make an aqueous solution with a concentration anywhere between 1%-100% by weight. More specifically, the concentration is between 20-80% by weight or between 20-40% by weight.

One Kg-mole of $CO_2$ in an air stream with 400 ppm of $CO_2$ concentration is brought in contact with the aqueous solution over time in a continuous flow reactor at a temperature between 5-110° C. More specifically, the temperature is between 10-75° C. or between 50-70° C. When most of the $CO_2$ is absorbed by the solution, the overhead pressure is released. A 0.1-2 wt % of a freshly prepared catalyst of the general formula $M-O-(OH)_n$ is added where "M" is Cr, V, Ti and/or Mo and "n" is an integer between one (1) and six (6).

A steam-jacketed desorber is then heated to between 50-150° C. More specifically, the desorber is heated to between 60-150° C. or between 70-135° C. to desorb $CO_2$. The overhead pure $CO_2$ is bottled for injection. The conversion and selectivity in the absorption step were 60-70% and 99%, and the conversion and selectivity in the desorption step were around 90-100% and 99% respectively.

Embodiment #17

In a seventeenth embodiment, high surface area solid materials such as Zeolites, Molecular Sieves, and MOFs that are stable under humid conditions are soaked in an aqueous base solution containing any one of potassium or sodium carbonate, tetrabutylammonium hydroxide or salts of amino acids like glycine, proline, and guanidine, dried and preconditioned. The base impregnated solid surfaces are exposed to air in a continuous flow reactor to capture $CO_2$, which after adsorption, are desorbed by a temperature swing process to get pure $CO_2$ gas as a product.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:
1. A method comprising:
   generating airflow over a packing material and out to ambient air;
   continuously coating the packing material with a base medium until the base medium acquires a first concentration of carbon dioxide;
   heating the base medium having the first concentration of carbon dioxide to remove the carbon dioxide, wherein air flowing along an output side of the packing material has less carbon dioxide than air flowing along an input side of the packing material; and
   compressing the carbon dioxide removed from the base medium.

2. The method of claim 1, wherein the method directly captures carbon dioxide from ambient air as a feedstock, wherein airflow is generated from ambient in a non-point source capture environment, and wherein the operation of generating the airflow comprises generating the airflow using an element selected from a group consisting of: a compressor, a blower, a fan, a turbofan, a pump, a diaphragm pump, an air contactor, a falling-film evaporator, and an absorber.

3. The method of claim 1, wherein the operation of continuously coating comprises evenly distributing the base medium over the packing material.

4. The method of claim 1, further comprising:
measuring the first concentration of carbon dioxide in situ using one or more automated sensing devices that measure conversion efficiency, flow rate, pressure, temperature, and carbon dioxide concentration in both the airflow and exhaust air from the packing material.

5. The method of claim 1, further comprising:
maintaining the base medium in a collection reservoir;
distributing the base medium from the collection reservoir to continuously coat the packing material; and
collecting excess amounts of the base medium from the packing material in the collection reservoir.

6. The method of claim 5, wherein the operation of heating further comprises:
generating a selected portion of the base medium having a concentration of carbon dioxide that is less than the first concentration of carbon dioxide; and
returning the selected portion of the base medium to the collection reservoir.

7. The method of claim 6, wherein the operation of heating further comprises:
collecting the base medium having the first concentration of carbon dioxide in a desorption chamber;
applying a catalyst to the desorption chamber; and
heating the desorption chamber to extract the carbon dioxide and generate the selected portion of the base medium having a concentration of carbon dioxide that is less than the first concentration of carbon dioxide.

8. The method of claim 7, further comprising:
generating the catalyst to have a general structure of $M(O)_x(OH)_y$ with 0.1-5 wt % concentration that lowers activation energy of a desorption reaction so that the desorption reaction can be performed at or below 95° C.

9. The method of claim 7, wherein the operation of heating the desorption chamber comprises:
increasing a chamber temperature to less than 130° C.

10. The method of claim 1, further comprising:
supplying the carbon dioxide that is removed to a sequestration system or to a low global warming refrigerant generation system.

11. The method of claim 1, wherein an absorption reaction occurs when the air flow contacts the base medium and the desorption reaction occurs when heat is applied to the base medium having the first concentration of carbon dioxide, and wherein the absorption reaction and desorption reaction are reversible reactions.

12. The method of claim 1, further comprising:
generating the base medium to comprise a mixture of water and solvents containing a base having at least one of sodium carbonate, potassium carbonate, and lithium carbonate, along with dissolved salts of amino acids of Glycine, Proline, Arginine, Guanidine, and Melamine as catalyst or promoter.

13. The method of claim 1, further comprising:
generating the base medium to comprise a phase transfer catalyst with a quaternary ammonium cation and a hydroxyl anion with the structure of the form $c[M^+]d[Y^-]$ that reduces interfacial surface tension between air bubble and water mist and promotes mixing in gas-liquid or gas-liquid-solid systems, wherein M is the cation species, wherein Y is the anion species, and wherein c and d are integers such that the total charge is neutral.

14. The method of claim 1, further comprising:
generating the base medium to comprise corrosion inhibitors, additives, or promoters, wherein the corrosion inhibitors include vanadium pentoxide or other metallic oxides, and wherein the additives or promoters include MEA (monoethanolamine), DEA (diethanolamine), Ethylene Diamine, TEA (triethanolamine), MDEA (methyl diethanolamine), piperazine, glycine, or any material that lowers an activation energy.

15. A method comprising:
generating airflow over a packing material and out to ambient air;
continuously coating the packing material with a base medium until the base medium acquires a first concentration of carbon dioxide;
heating the base medium having the first concentration of carbon dioxide to remove the carbon dioxide, wherein air flowing along an output side of the packing material has less carbon dioxide than air flowing along an input side of the packing material;
maintaining the base medium in a collection reservoir;
distributing the base medium from the collection reservoir to continuously coat the packing material;
collecting excess amounts of the base medium from the packing material in the collection reservoir;
capturing a portion of the base medium from air flowing out from the packing material; and
returning the portion of the base medium to the collection reservoir.

16. An apparatus comprising:
an air mover that generates airflow over a packing material;
a pump that continuously coats the packing material with a base medium until the base medium acquires a first concentration of carbon dioxide;
a heated reservoir that heats the base medium having the first concentration of carbon dioxide to remove the carbon dioxide; and
a compression system that compresses the carbon dioxide removed from the base medium.

17. The apparatus of claim 16, wherein the air mover is selected from a group consisting of: a compressor, a blower, a fan, a turbofan, a pump, a diaphragm pump, an air contactor, a falling-film evaporator, and an absorber.

18. The apparatus of claim 16, further comprising:
a distributor that evenly distributes the base medium over the packing material.

19. The apparatus of claim 16, further comprising:
a processor configured to measure the first concentration of carbon dioxide using one or more automated sensing devices that measure conversion efficiency, flow rate, pressure, temperature, and carbon dioxide concentration in both the airflow and exhaust air from the packing material.

20. The apparatus of claim 19, wherein the processor performs operations of:
maintaining the base medium in a collection reservoir;
distributing the base medium from the collection reservoir to continuously coat the packing material; and
collecting excess amounts of the base medium from the packing material in the collection reservoir.

21. The apparatus of claim 16, wherein the heated reservoir performs operations of:
generating a selected portion of the base medium having a concentration of carbon dioxide that is less then the first concentration of carbon dioxide; and
returning the selected portion of the base medium to the collection reservoir.

22. The apparatus of claim 16, wherein the heated reservoir performs operations of:
collecting the base medium having the first concentration of carbon dioxide;
applying a catalyst to the base medium having the first concentration of carbon dioxide; and
heating the base medium and catalyst to extract the carbon dioxide and generate the selected portion of the base medium having a concentration of carbon dioxide that is less then the first concentration of carbon dioxide.

23. The apparatus of claim 22, wherein the catalyst has a general structure of $M(O)_x(OH)_y$ with 0.1-5 wt % concentration that lowers activation energy of a desorption reaction so that the desorption reaction can be performed at or below 95° C.

24. The apparatus of claim 16, wherein temperature of the heated reservoir is increased to less than 130° C.

25. The apparatus of claim 16, wherein the airflow has a concentration of carbon dioxide between 0-100% and an exhaust of air from the packing material has a lower concentration of carbon dioxide.

26. The apparatus of claim 16, wherein an absorption reaction occurs when the airflow contacts the base medium, wherein a desorption reaction occurs when heat is applied to the base medium having the first concentration of carbon dioxide, and wherein the absorption reaction and desorption reaction are reversible reactions.

27. The apparatus of claim 16, wherein the base medium comprises a mixture of water and solvents containing a base having at least one of sodium carbonate, potassium carbonate, and lithium carbonate, along with dissolved salts of amino acids of Glycine, Proline, Arginine, Guanidine, and Melamine as catalyst or promoter.

28. The apparatus of claim 16, wherein the base medium comprises a phase transfer catalyst with a quaternary ammonium cation and a hydroxyl anion with the structure of the form $c[M^+]d[Y^-]$ that reduces interfacial surface tension between air bubble and water mist and promotes mixing in gas-liquid or gas-liquid-solid systems, wherein M is the cation species, wherein Y is the anion species, and wherein c and d are integers such that the total charge is neutral.

29. The apparatus of claim 16, wherein the base medium comprises corrosion inhibitors, additives, or promoters, wherein the corrosion inhibitors include vanadium pentoxide or other metallic oxides, and wherein the additives or promoters include MEA (monoethanolamine), DEA (diethanolamine), Ethylene Diamine, TEA (triethanolamine), MDEA (methyl diethanolamine), piperazine, glycine, or any material that lowers the activation energy.

30. An apparatus comprising:
an air mover that generates airflow over a packing material;
a pump that continuously coats the packing material with a base medium until the base medium acquires a first concentration of carbon dioxide;
a heated reservoir that heats the base medium having the first concentration of carbon dioxide to remove the carbon dioxide;
a processor configured to measure the first concentration of carbon dioxide using one or more automated sensing devices that measure conversion efficiency, flow rate, pressure, temperature, and carbon dioxide concentration in both the airflow and exhaust air from the packing material, wherein the processor performs operations of:
maintaining the base medium in a collection reservoir;
distributing the base medium from the collection reservoir to continuously coat the packing material; and
collecting excess amounts of the base medium from the packing material in the collection reservoir; and
a condenser that captures a portion of the base medium from exhaust air flowing from the packing material, and returns the portion of the base medium to the collection reservoir.

* * * * *